United States Patent
Park

(10) Patent No.: US 8,212,930 B2
(45) Date of Patent: Jul. 3, 2012

(54) METHOD OF CONTROLLING DISPLAY CHARACTERISTIC AND TELEVISION RECEIVER USING THE SAME

(75) Inventor: Yong Duck Park, Gimcheon-si (KR)

(73) Assignee: LG Electronics Inc., Seoul (KP)

( * ) Notice: Subject to any disclaimer, the term of this patent is extended or adjusted under 35 U.S.C. 154(b) by 1220 days.

(21) Appl. No.: 11/599,431

(22) Filed: Nov. 15, 2006

(65) Prior Publication Data

US 2007/0296867 A1  Dec. 27, 2007

(30) Foreign Application Priority Data

Jun. 27, 2006 (KR) .......................... 10-2006-0058062

(51) Int. Cl.
- H04N 17/00 (2006.01)
- H04N 17/02 (2006.01)
- H04N 5/58 (2006.01)
- H04N 5/44 (2011.01)
- G06F 3/038 (2006.01)
- G09G 5/00 (2006.01)

(52) U.S. Cl. ........ 348/602; 348/180; 348/184; 348/725; 345/207

(58) Field of Classification Search .................. 348/180, 348/184, 602–603, 725; 345/207
See application file for complete search history.

(56) References Cited

U.S. PATENT DOCUMENTS

| | | | | |
|---|---|---|---|---|
| 5,442,375 A | * | 8/1995 | Wojaczynski et al. | 345/589 |
| 5,488,434 A | * | 1/1996 | Jung | 348/725 |
| 5,956,015 A | * | 9/1999 | Hino | 345/600 |
| 6,094,185 A | * | 7/2000 | Shirriff | 345/102 |
| 6,327,708 B1 | * | 12/2001 | Monsees | 725/12 |
| 6,342,925 B1 | * | 1/2002 | Akhavan et al. | 348/563 |
| 6,459,436 B1 | * | 10/2002 | Kumada et al. | 345/590 |
| 6,480,202 B1 | * | 11/2002 | Deguchi et al. | 345/600 |

(Continued)

FOREIGN PATENT DOCUMENTS

DE  103 38 484 A1  3/2005

(Continued)

OTHER PUBLICATIONS

Korean Decision to Grant a Patent dated Nov. 30, 2007 for Application No. 10-2006-00508062.

(Continued)

Primary Examiner — Brian Yenke
(74) Attorney, Agent, or Firm — KED & Associates LLP

(57) ABSTRACT

A method of controlling a display characteristic in a television receiver enables automatic adjustment of the display characteristic according to ambient illuminance levels. The television receiver includes a display module for displaying a video signal; an illuminance sensor for detecting an ambient illuminance, the detected ambient illuminance corresponding to one of a plurality of primary display grades for controlling at least one display characteristic of the display module; a system controller for determining, based on the detected ambient illuminance, the primary display grade corresponding to the detected ambient illuminance and for determining a final display grade with respect to the determined primary display grade; and a display characteristic controller for generating at least one display characteristic control value corresponding to the final display grade and for controlling the display module using the generated at least one display characteristic control value. A user interface device is provided to the television receiver for selecting one of a plurality of secondary display grades with respect to the determined primary display grade. The system controller determines the final display grade based on the determined primary display grade and the selected secondary display grade, where each of the plurality of secondary display grades corresponds to the determined primary display grade.

25 Claims, 4 Drawing Sheets

U.S. PATENT DOCUMENTS

| | | | |
|---|---|---|---|
| 6,618,045 B1 * | 9/2003 | Lin | 345/207 |
| 6,686,953 B1 * | 2/2004 | Holmes | 348/179 |
| 6,798,460 B2 * | 9/2004 | Saiki et al. | 348/553 |
| 6,870,529 B1 * | 3/2005 | Davis | 345/207 |
| 6,947,017 B1 * | 9/2005 | Gettemy | 345/63 |
| 7,027,067 B1 * | 4/2006 | Ohga et al. | 345/589 |
| 7,119,852 B1 * | 10/2006 | Vandeginste | 348/602 |
| 7,148,929 B1 * | 12/2006 | Mori et al. | 348/553 |
| 7,259,769 B2 * | 8/2007 | Diefenbaugh et al. | 345/604 |
| 7,268,775 B1 * | 9/2007 | Gettemy | 345/204 |
| 7,348,957 B2 * | 3/2008 | Cui et al. | 345/102 |
| 7,351,947 B2 * | 4/2008 | Dailey et al. | 250/214 AL |
| 7,439,984 B2 * | 10/2008 | Yamada | 345/589 |
| 7,456,829 B2 * | 11/2008 | Fry | 345/204 |
| 7,460,179 B2 * | 12/2008 | Pate et al. | 348/602 |
| 7,482,565 B2 * | 1/2009 | Morgan et al. | 250/205 |
| 7,499,163 B2 * | 3/2009 | Lianza et al. | 356/402 |
| 7,581,841 B2 * | 9/2009 | Tamura | 353/121 |
| 7,595,811 B2 * | 9/2009 | Matsuda | 345/690 |
| 7,614,753 B2 * | 11/2009 | Zavarehi et al. | 353/85 |
| 7,616,262 B2 * | 11/2009 | Eves et al. | 348/553 |
| 7,633,558 B2 * | 12/2009 | Tsai et al. | 348/687 |
| 7,808,556 B2 * | 10/2010 | Simkine | 348/602 |
| 2003/0164927 A1 | 9/2003 | Tsukada | 353/31 |
| 2004/0207613 A1 | 10/2004 | Morisawa | 345/207 |
| 2005/0024538 A1 * | 2/2005 | Park et al. | 348/602 |
| 2007/0081102 A1 * | 4/2007 | Ramanath et al. | 348/602 |
| 2009/0033801 A1 * | 2/2009 | Gutta et al. | 348/708 |
| 2009/0079721 A1 * | 3/2009 | Gettemy | 345/207 |

FOREIGN PATENT DOCUMENTS

| | | |
|---|---|---|
| EP | 1 429 551 A2 | 6/2004 |
| KR | 10-1996-0043827 | 12/1996 |
| KR | 10-1996-0043829 | 12/1996 |
| KR | 10-1998-056957 | 9/1998 |
| KR | 10-1998-056957 A | 9/1998 |
| KR | 10-2000-0037659 A | 7/2000 |
| KR | 10-2006-0034780 | 4/2006 |
| WO | WO 00/60855 | 10/2000 |

OTHER PUBLICATIONS

Korean Office Action dated Jun. 28, 2007.
Korean Decision to Grant a Patent dated Aug. 31, 2007 for Application No. 10-2006-0058062.
European Search Report dated Aug. 1, 2007.

* cited by examiner

METHOD OF CONTROLLING DISPLAY CHARACTERISTIC AND TELEVISION RECEIVER USING THE SAME

This application claims the benefit of Korean Patent Application No. 10-2006-0058062, filed on Jun. 27, 2006, which is hereby incorporated by reference as if fully set forth herein.

BACKGROUND OF THE INVENTION

1. Field of the Invention

The present invention relates to television receivers, and more particularly, to a method of controlling a display characteristic of a television receiver and a television receiver using the same.

2. Discussion of the Related Art

A contemporary television receiver is provided with a set of external controls such as keys or dials, which, as a user interface device, may be located on a remote control device or on the television receiver itself, for manually setting corresponding display characteristics of a screen of the television receiver. Such a user interface device provides the user with means to adjust as desired a variety of display characteristics, for example, contrast, brightness, color, tint, and sharpness. In other words, a user manually controls a display characteristic of a contemporary television receiver by manipulating the corresponding external control.

The above display characteristics are subjective parameters but are particularly affected by the current ambient conditions in the vicinity of the screen with respect to the television receiver's installation site. That is, the ambient conditions directly affect the display characteristics, and the most significant ambient condition is luminous intensity, which can be measured as luminous flux (lux) incident on a unit area, where one lux (lx) of illuminance equals one lumen per square meter ($lm/m^2$).

In cases where the level of ambient illuminance is high or low, a brightness display characteristic of a screen should be set accordingly. Other display characteristics are likewise manually adjusted according to user preference, such that performance of an individual adjustment of each display characteristic is necessary for varying ambient luminosities, which inconveniences the user.

SUMMARY OF THE INVENTION

Accordingly, the present invention is directed to a display characteristic control method and a television receiver using the same that substantially obviates one or more problems due to limitations and disadvantages of the related art.

An object of the present invention is to provide a method of controlling a display characteristic and a television receiver using the same, by which the display characteristic of the television receiver can be automatically adjusted according to ambient illuminance levels.

Another object of the present invention is to provide a method of controlling a display characteristic of a television receiver and a television receiver using the same, by which a primary display characteristic is automatically adjusted according to ambient illuminance levels and by which a secondary display characteristic can be correspondingly adjusted according to user preference using a user interface device.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages in accordance with the purpose of the invention, as embodied and broadly described herein, there is provided a television receiver comprising a display module for displaying a video signal; an illuminance sensor for detecting an ambient illuminance, the detected ambient illuminance corresponding to one of a plurality of primary display grades for controlling at least one display characteristic of the display module; a system controller for determining, based on the detected ambient illuminance, the primary display grade corresponding to the detected ambient illuminance and for determining a final display grade with respect to the determined primary display grade; and a display characteristic controller for generating at least one display characteristic control value corresponding to the final display grade and for controlling the display module using the generated at least one display characteristic control value.

According to another aspect of the present invention, there is provided a method of controlling at least one display characteristic in a television receiver having an illuminance sensor for detecting ambient illuminance. The method comprises assigning a plurality of primary display grades and a plurality of secondary display grades, the primary display grades controlling the at least one display characteristic of the display module and the secondary display grades controlling the at least one display characteristic of the display module with respect to each primary display grade; selecting an analog value corresponding to the detected ambient illuminance; converting the detected analog value into a digital value; automatically setting one of the primary display grades according to the digital value; adjusting the at least one display characteristic based on a display control value corresponding to the set primary display grade; selecting one of the secondary display grades to determine a final display grade; and controlling the at least one display characteristic based on a final display control value corresponding to the determined final display grade.

Thus, an ambient illuminance level is measured, and the measured illuminance is converted into a digital value. A display characteristic is appropriately adjusted according to the digital value. In case of attempting to adjust the appropriately adjusted display characteristic, a user is able to further accurately adjust the display characteristic.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to exemplary embodiments of the present invention, examples of which are illustrated in the accompanying drawings. Wherever possible, like reference designations will be used throughout the drawings to refer to the same or similar parts.

A television receiver adopting the present invention includes a "digital eye" function enabling digital control to adjust a display characteristic based on detected ambient conditions. Thus, the present invention employs a digital eye method including steps of measuring ambient illuminance by detecting a level of illuminance measured externally with respect to a display screen, generating an analog value corresponding to the measured ambient illuminance, converting the analog value into a digital value, and appropriately adjusting (controlling) a display characteristic of a television receiver based on the digital value.

Figure 1:
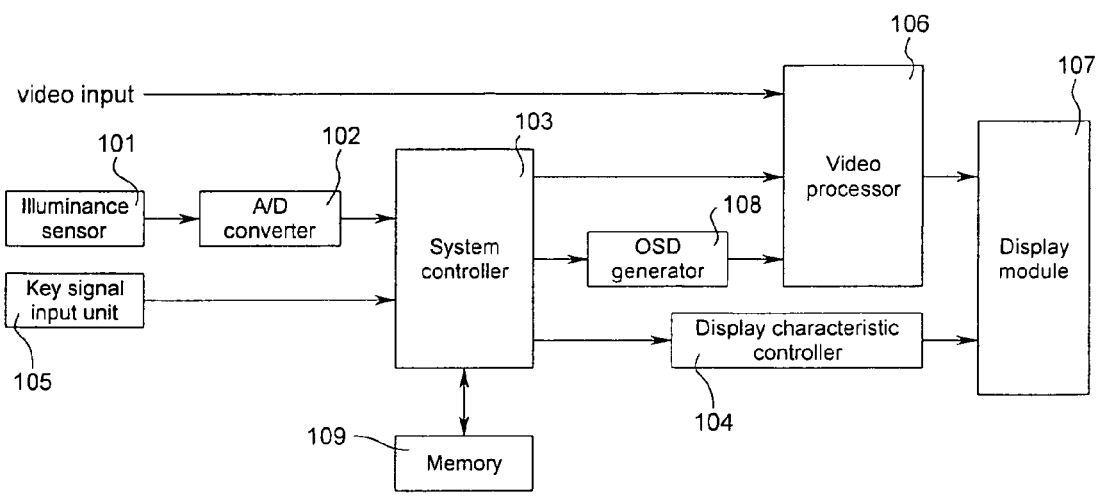
FIG. 1 is a block diagram of a television receiver according to the present invention.

Referring to FIG. 1, a television receiver according to the present invention includes an illuminance sensor 101 for detecting (measuring) an ambient illuminance with respect to the television receiver; an analog-to-digital (A/D) converter 102 for converting the detected ambient illuminance into a digital value corresponding to one of a predetermined number of digital values, for example, 64 digital values; a system controller 103 for determining a primary display grade setting at least one display characteristic of a screen according to the digital value and for determining a final display grade based on a selected one of a plurality of secondary display grades corresponding to the determined primary display grade; a display characteristic controller 104 for outputting, to a display module under control of the system controller, a display characteristic control signal based on primary and secondary grade values corresponding to the determined grades per display characteristic; a key signal input unit 105 as a user interface device for inputting a command signal to the system controller according to user selections; a video processor 106; a display module 107; an on-screen display (OSD) generator 108 for generating OSD data corresponding to the secondary display grades, to enable a user interface for a user selection via the key signal input unit of a secondary display grade and thereby determine a final display grade; and a memory 109 for storing a set of the primary and secondary grade values per display characteristic. Accordingly, the display characteristic controller 104 receives display characteristic control values corresponding to the final display grade and outputs a corresponding display characteristic control signal to control at least one display characteristic, namely, one or more of a contrast, a brightness, a color, and a sharpness of an image (video signal) displayed on the display module 107.

The video processor 106 may be a composite video signal processor, i.e., a processor including audio circuitry for providing a speaker output, and typically receives at least one composite video input signal that has been selectively applied from a signal source such as a tuner or peripheral input, to produce a displayable signal including an audible component. In the present invention, the video processor 106 processes at least one selected composite video signal, i.e., a video input, to output a video signal to the display module 107, for example, a flat-panel display device such as a PDP or LCD module, and may output an audio signal to a speaker (not shown).

A digital television receiver according to the present invention measures an ambient illuminance using the illuminance sensor 101, to convert the measured analog illuminance value into a digital value using the analog-to-digital converter 102, which receives from the illuminance sensor a sampled signal at a rate of about 20 ms and generates one of a predetermined number of digital values according to the measured ambient illuminance. The digital value output of the analog-to-digital converter 102 to the system controller 103 may be achieved as an average over a period of about 500 ms. A manufacturer of the television receiver may, using a test measurement of ambient luminosities, assign a plurality of grades (digital value ranges) to the predetermined number of digital values, say, 64 values, to classify the digital values according to grade. Here, the entire range of available digital values is evenly distributed over the plurality of grades; in this case, five grades, i.e., first to fifth grades, are assigned. A display characteristic of the screen is then adjusted by the system controller 103 according to a corresponding grade.

Table 1 includes an exemplary set of display characteristic control values, which are stored in the memory 109 with respect to digital ambient illuminance values and arranged according to grade for each of five display characteristics. Values of Table 1 may be defined by a manufacturer.

TABLE 1

| ambient illuminance (lm/m$^2$) | primary grade values | secondary grade value | contrast | brightness (Y bias) | color | tint | sharpness |
|---|---|---|---|---|---|---|---|
| over 150 lx | 48~63 (1st grade) | +3 | 106% | 76 (−15) | 70 | 0 | 70 |
| | | +2 | 104% | 66 (−35) | 70 | 0 | 70 |
| | | +1 | 102% | 56 (−55) | 70 | 0 | 70 |
| | | 0 | 100% | 40 (−75) | 70 | 0 | 70 |
| | | −1 | 85% | 37 (−85) | 70 | 0 | 70 |
| | | −2 | 70% | 33 (−95) | 70 | 0 | 70 |
| | | −3 | 55% | 30 (−105) | 70 | 0 | 70 |
| 118~150 lx | 36~47 (2nd grade) | +3 | 105% | 88 (−11) | 60 | 0 | 60 |
| | | +2 | 103% | 68 (−31) | 60 | 0 | 60 |
| | | +1 | 101% | 58 (−51) | 60 | 0 | 60 |
| | | 0 | 95% | 45 (−71) | 60 | 0 | 60 |

TABLE 1-continued

| ambient illuminance (lm/m$^2$) | primary grade values | secondary grade value | contrast | brightness (Y bias) | color | tint | sharpness |
|---|---|---|---|---|---|---|---|
| | | −1 | 80% | 38 (−81) | 60 | 0 | 60 |
| | | −2 | 65% | 35 (−91) | 60 | 0 | 60 |
| | | −3 | 50% | 32 (−101) | 60 | 0 | 60 |
| 84~118 lx | 24~35 (3rd grade) | +3 | 104% | 80 (−07) | 50 | 0 | 50 |
| | | +2 | 102% | 70 (−27) | 50 | 0 | 50 |
| | | +1 | 100% | 60 (−47) | 50 | 0 | 50 |
| | | 0 | 90% | 50 (−67) | 50 | 0 | 50 |
| | | −1 | 75% | 39 (−77) | 50 | 0 | 50 |
| | | −2 | 60% | 36 (−87) | 50 | 0 | 50 |
| | | −3 | 45% | 33 (−97) | 50 | 0 | 50 |
| 50~84 lx | 12~23 (4th grade) | +3 | 102% | 85 (−03) | 45 | 0 | 45 |
| | | +2 | 97% | 75 (−17) | 45 | 0 | 45 |
| | | +1 | 90% | 65 (−37) | 45 | 0 | 45 |
| | | 0 | 80% | 55 (−57) | 45 | 0 | 45 |
| | | −1 | 67% | 47 (−67) | 45 | 0 | 45 |
| | | −2 | 53% | 43 (−77) | 45 | 0 | 45 |
| | | −3 | 40% | 36 (−87) | 45 | 0 | 45 |
| under 50 lx | 0~11 (5th grade) | +3 | 100% | 90 (+13) | 40 | 0 | 40 |
| | | +2 | 90% | 80 (−07) | 40 | 0 | 40 |
| | | +1 | 80% | 70 (−27) | 40 | 0 | 40 |
| | | 0 | 70% | 60 (−47) | 40 | 0 | 40 |
| | | −1 | 57% | 55 (−57) | 40 | 0 | 40 |
| | | −2 | 46% | 50 (−67) | 40 | 0 | 40 |
| | | −3 | 35% | 39 (−77) | 40 | 0 | 40 |

As can be seen from Table 1, ambient illuminance may be classified into one of five primary display grades, namely, a first, second, third, fourth, or fifth grade, corresponding to a range of primary grade values determined according to a detected level of illuminance that is measured externally with respect to a front or forwardly disposed part of the display module 107, and a plurality of secondary grade values are allotted to each of the five primary display grades. The resulting display characteristic may be determined with respect to each of a contrast, brightness, color, tint, and sharpness, where each of the contrast, brightness, color, and sharpness control values of Table 1 are based on (proportional to) the detected luminosities as well as the corresponding grades. In the exemplar of Table 1, the tint display characteristic is nominally set at zero regardless of values determined for the primary and secondary display grades; the color and sharpness display characteristics are typically equal and generally remain constant throughout any given grade, that is, with no adjustment made according to secondary grade value.

Accordingly, if the level of ambient illuminance is over 150 lx (i.e., ≧150 lx or not less than 150 lx), a display characteristic is classified as a first grade in which the output of the analog-to-digital converter 102 has a value range of 48~63. If ambient illuminance is 118~150 lx, a display characteristic is classified as a second grade in which the output of the analog-to-digital converter 102 has a value range of 36~47. If ambient illuminance is 84~118 lx, a display characteristic is classified as a third grade in which the output of the analog-to-digital converter 102 has a value range of 24~35. If ambient illuminance is 50~84 lx, a display characteristic is classified as a fourth grade in which the output of the analog-to-digital converter 102 has a value range of 12~23. If the level of ambient illuminance is under 50 lx (i.e., ≦50 lx or not greater than 50 lx), a display characteristic is classified as a fifth grade in which the output of the analog-to-digital converter 102 has a value range of 0~11. Assuming a secondary grade value of zero for each of the above five grades, that is, before (or without) determining a secondary grade value, the first-grade settings for contrast, brightness, color, and sharpness are 100%, 40 (−75), 70, and 70, respectively; the second-grade settings for contrast, brightness, color, and sharpness are 95%, 45 (−71), 60, and 60, respectively; the third-grade settings for contrast, brightness, color, and sharpness are 90%, 50 (−67), 50, and 50, respectively; the fourth-grade settings for contrast, brightness, color, and sharpness are 80%, 55 (−57), 45, and 45, respectively; and the fifth-grade settings for contrast, brightness, color, and sharpness are 70%, 60 (−47), 40, and 40, respectively. A further display characteristic may include a video value selected according to a manufacturer-defined or user-defined set of characteristics, for example, a "sharp" video value, a "comfort" video value, or a "smooth" video value, one of which may be set as part of a default condition.

According to the present invention, a primary display grade may be determined automatically and a secondary display grade may be determined in accordance with a user selection. In more detail, once a primary display grade is determined, a secondary display grade decision step may be preformed via a user interface menu using OSD data displayed on the screen. In the secondary display grade decision step, a plurality of secondary display grades are generated and displayed as sub-grades with respect of each primary grade. If a user selects one of the sub-grades, a final display grade for providing a more preferred picture to the user is determined (set) based on each of the determined display grades, namely, the primary and secondary display grades. A predetermined number of secondary grade values may be defined for increasing (incrementing) the contrast and brightness control values of a corresponding primary grade, and a corresponding number of secondary grade values may be defined for decreasing (decrementing) the contrast and brightness control values of a corresponding primary grade. Thus, with three incrementing values, three decrementing values, and a zero value, each of the primary grades may have a total of seven possible sub-grades. Color, tint, and sharpness display characteristics typically exhibit no variations according to the selected sub-grade.

Figure 2:
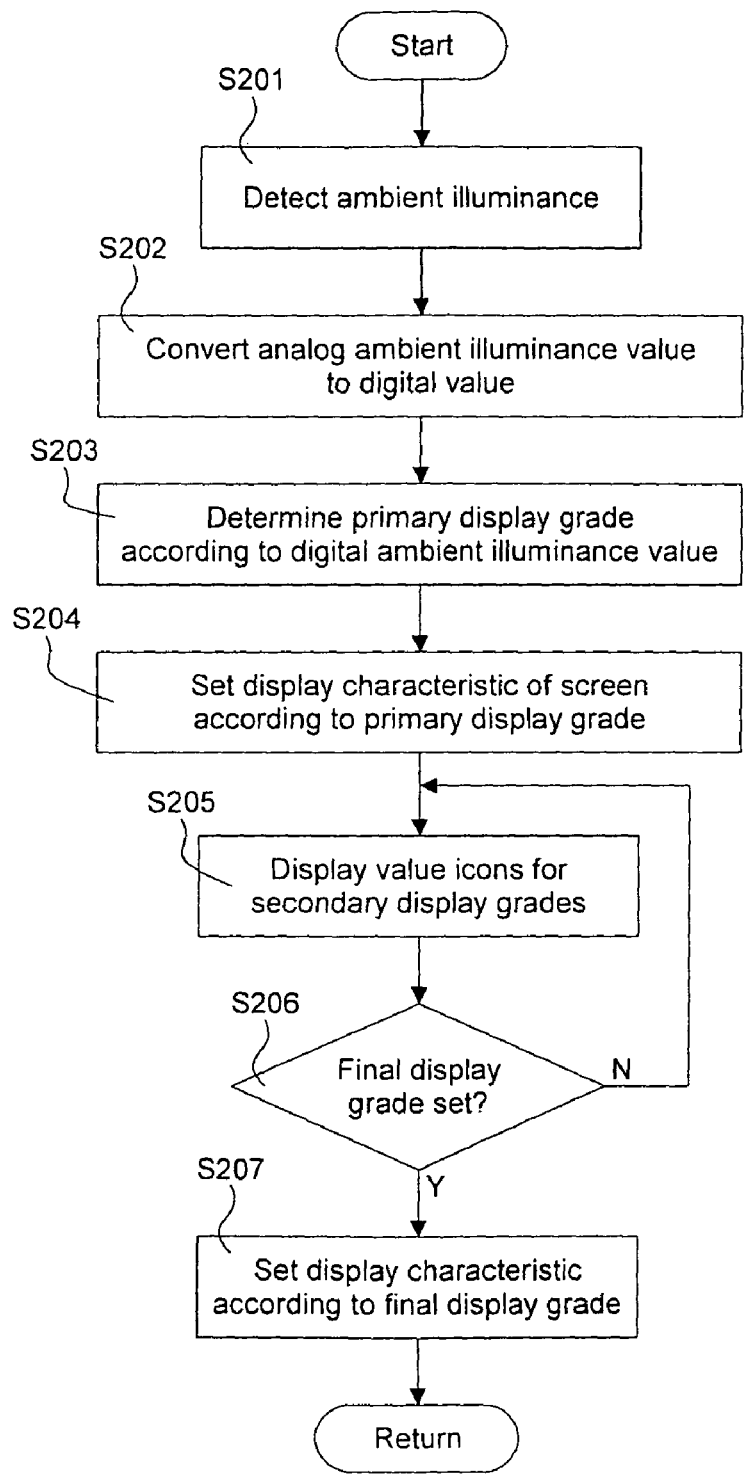
FIG. 2 is a flowchart of a display characteristic control method according to the present invention.

As shown in FIG. 2, illustrating a display characteristic control method according to the present invention, ambient illuminance is detected as an analog value by the illuminance sensor 101 at a sample rate determined by the system controller 103 (S201). The detected analog value is output to the analog-to-digital converter 102, which converts the analog ambient illuminance value into a corresponding digital value and provides the digital value to the system controller 103 (S202). Ambient illuminance sampling is continuously performed so that the system controller 103 may control the display characteristics based on updated digital ambient illuminance values. According to the currently provided digital value, the system controller 103 determines a primary display grade and then controls (sets) display characteristics of the screen using a set of display characteristic control values corresponding to the determined primary display grade (S203, S204). The system controller 103 controls the OSD generator 108 to output OSD data indicative of a plurality of value icons for a selected secondary display grade corresponding to the determined primary display grade, which are displayed on a screen 107a via the display module 107 (S205). This on-screen display may be in accordance with the exemplars of FIG. 3A or 3B and enables user interface and selection based on the corresponding primary display grade. Based on a user selection of a secondary display grade, the system controller 103 determines whether a final display grade has been set according to a selected secondary display grade and then readjusts (sets) the display characteristics using a set of display characteristic control values corresponding to the determined final display grade (S203, S204). Here, it should be appreciated that there may be no user selection of a secondary display grade, whereby the system controller 103 determines the final display grade based on the primary display grade only.

According to the display characteristic control method as described above, when it is determined that there has been a change in the digital value such that a boundary value of a current primary display grade is passed by a predetermined value (boundary value +/−α), the current primary display grade is changed to the next-higher or lower-grade. In particular, in response to a determination by the system controller 103 that an analog ambient illuminance value as detected by the illuminance sensor 101 is newly input to the analog-to-digital converter 102, thereby determining that an updated digital ambient illuminance value is available, the system controller determines based on the currently supplied digital value which of the preset first to fifth display grades is to be set initially on the screen. The system controller 103 thus determines the corresponding grade as a primary display grade and generates via the display characteristic controller 104 a corresponding set of display characteristic control values as shown in Table 1. The system controller 103 controls the OSD generator 108 to display an OSD menu (user interface menu) such as that shown in FIG. 3A or 3B, so that a secondary or final display grade may be determined according to a user selection.

Figure 3A:
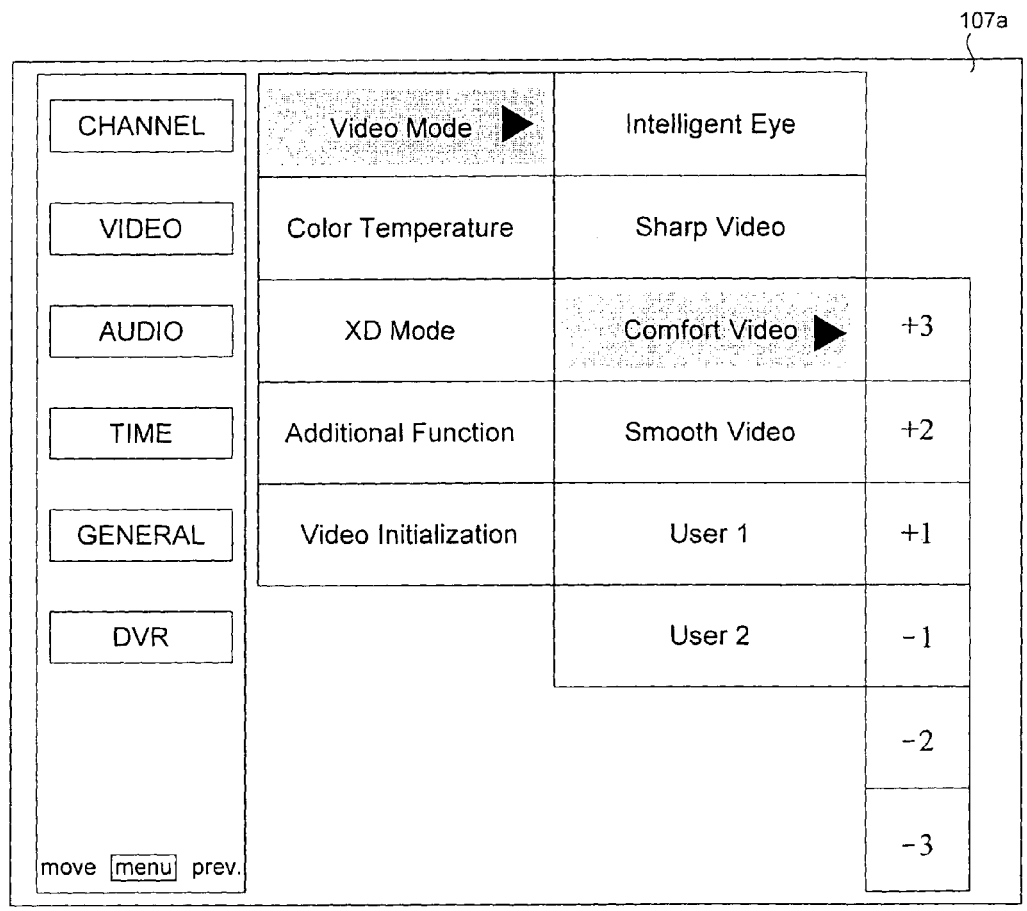
FIG. 3A is a diagram of an exemplary user interface menu for executing a digital eye function according to the method of the present invention.
Figure 3B:
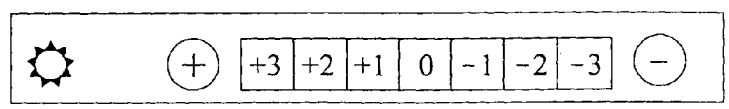
FIG. 3B is a diagram of another user interface menu, which may be generated as an on-screen display appearing on a screen responsive to activation of a hot key for executing a digital eye function according to the method of the present invention.

Referring to FIG. 3A, by operating the key signal input unit 105, a plurality of menu icons such as "channel," "video," "audio," "time," "general," and "DVR" may be displayed on the screen 107a. With a subsequent operation of the key signal input unit 105, for example, by activating the above video menu icon, a set of mode menu items (e.g., video mode, color temperature, XD mode, additional function, and video initialization) corresponding to the above video menu item may be displayed. Thus, a video mode may be entered by another subsequent operation of the key signal input unit 105, for example, by pressing the above video menu item followed by a pressing of the video mode menu item for the digital eye (intelligent eye) function, to thereby generate of a set of sub-menu items including, for example, sharp video, comfort video, smooth video, user 1, and user 2. In doing so, one of the sub-menu items may be highlighted, indicating that a primary display grade is set by default or according the primary display grade determination. Optionally, as shown in FIG. 3B, activation of a hot key for selecting the final display grade results in an on-screen display of a plurality of secondary display grades corresponding to a determined primary display grade. In other words, the highlighted sub-menu item or hot-key selection corresponds to the determined primary display grade, namely, one of the first through fifth grades.

The above "sharp," "comfort," and "smooth" video settings each include a set of display characteristic values stored in the memory 109 according to Table 1 and may correspond to the first, third, and fifth grades, respectively. Meanwhile, display characteristic values of either of user 1 and user 2 may be assigned to a predetermined set of display characteristics, as in Table 1, to reflect a preferred set of display characteristics stored in the memory 109 according to user preferences. For instance, if the primary display grade is determined as the comfort video setting, e.g., the third grade, the highlighted sub-menu item is "comfort" video" and a corresponding set of secondary grade values are displayed, i.e., +3, +2, +1, 0, −1, −2, and −3. Thereafter, one of these values may be selected to determine the secondary display grade and thus the final display grade. For instance, if the user selects a +3 secondary grade value per the third grade, i.e., the comfort video mode, the system controller 103 generates via the display characteristic controller 104 an appropriate set of display characteristic control values, i.e., a contrast control value of 104%, a brightness control value of 80 (−07), a color control value of 50, a tint control value of 0, and a sharpness control value of 50, and applies the above display characteristic control values to the display module 107, which thus provides a controlled screen having the specific display characteristics according to the user selection.

Figure 4:
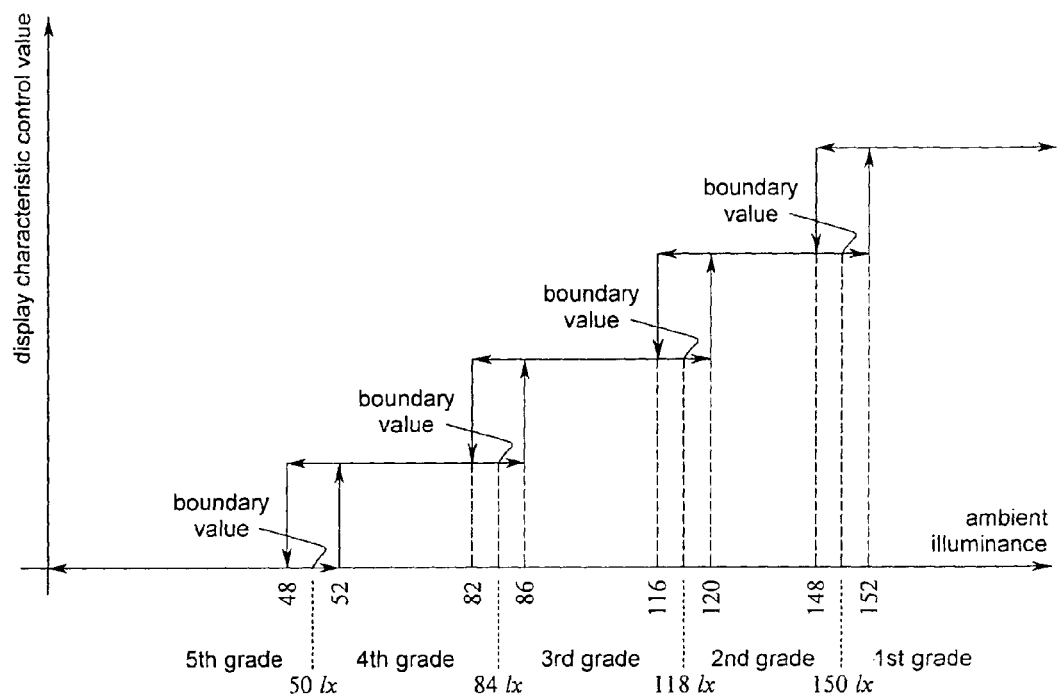
FIG. 4 is a graph of ambient luminosities versus display characteristic control values arranged according to a plurality of display grades, illustrating a hysteresis curve of a digital eye function according to the method of the present invention.

FIG. 4 demonstrates the determination of a primary display grade according to ambient illuminance level, including a hysteresis effect for implementing a digital eye function to prevent a flickering phenomenon from appearing on the screen, which may occur as a result of frequent changes in the display characteristic control value according to minute variations in ambient conditions. Here, although a current primary display grade changes to a next-higher or next-lower grade when a predetermined increment or decrement in luminosity is detected with respect to a boundary value existing between adjacent grades, flickering is prevented by the ensuing hysteresis effect. For instance, assuming that a current display characteristic grade is the second grade and that a boundary value between the second and first grades is 150 lx, if the digital value of the ambient illuminance surpasses a value of 152 (or 150+2), the system enters the first grade; that is, the current display characteristic grade changes from the second grade to the first grade. Subsequently, if the digital value drops below 148 (or 150−2), the current display characteristic grade changes from the first grade to the second grade such that the system enters the second grade.

Embodiments of the present invention include a computer-readable medium storing a set of program commands for executing operations implemented by a computer. The computer-readable medium may include the program commands, a data file, a data structure, and other computer-program-related data. The medium and the stored program commands are configured in accordance with the present invention and may be specifically designed for the above-described embodiment or may comprise a device and program combination known to those skilled in the field of computer software.

Accordingly, the present invention enables automatic adjustment of a display characteristic, thereby avoiding the inconvenience in manually adjusting a display characteristic. Since parameters of a plurality of display characteristics may be effectively ganged together, the inconvenience of individually controlling each display characteristic is likewise avoided. In addition, reduced power consumption may be achieved by measuring ambient illuminance to enable an appropriate adjustment of a display characteristic according to continuously changing ambient conditions. Employment of a digital method provides an enhanced display characteristic of a screen to a user.

It will be apparent to those skilled in the art that various modifications can be made in the present invention without departing from the spirit or scope of the invention. Thus, it is intended that the present invention covers such modifications provided they come within the scope of the appended claims and their equivalents.

What is claimed is:

1. A television receiver, comprising:
    a display module configured to display a video signal;
    an illuminance sensor configured to detect an ambient illuminance;
    a controller configured to automatically determine, based on the detected ambient illuminance, one of a plurality of predetermined primary display grades for controlling at least one display characteristic of the display module, to provide information to allow for user selection of one of a plurality of predetermined secondary display grades corresponding to the determined primary display grade, and to adjust the at least one display characteristic according to the selected secondary display grade, wherein:
    each predetermined primary display grade includes a first number of values,
    each predetermined secondary display grade includes a second number of values,
    the first number of values is greater than the second number of values,
    the predetermined primary display grades are different from the predetermined secondary display grades that are selectable by a user,
    the predetermined primary display grades and predetermined secondary display grades are stored in a memory before the ambient illuminance is detected,
    said one of the plurality of predetermined primary display grades is automatically selected by the controller without user input, and
    the information provided by the controller to allow for user selection of said one of the plurality of predetermined secondary display grades is automatically displayed after the ambient illuminance is detected by the sensor.

2. The television receiver of claim 1, wherein the at least one display characteristic is selected from the group consisting of contrast, brightness, color, and sharpness.

3. The television receiver of claim 1, wherein said illuminance sensor outputs an analog ambient illuminance value based on the detected ambient illuminance.

4. The television receiver of claim 3, further comprising:
    an analog-to-digital converter for converting the detected ambient illuminance into a digital value, wherein the determined primary display grade is based on the digital value.

5. The television receiver of claim 1, further comprising:
    an on-screen display (OSD) generator configured to generate, under control of the controller, OSD data for displaying the plurality of predetermined and pre-stored secondary display grades using the display module.

6. The television receiver of claim 1, wherein the controller determines a final display grade based on the determined primary display grade and the selected one of the predetermined and pre-stored secondary display grades, generates at least one display characteristic control value corresponding to the final display grade, and controls the display module based on the generated at least one display characteristic control value.

7. The television receiver of claim 1, wherein the memory is configured to store a control value corresponding to the at least one display characteristic.

8. The television receiver of claim 7, wherein said the memory stores multiple ones of the predetermined and pre-stored primary and secondary grade values per display characteristic.

9. The television receiver of claim 1, wherein information associating one of the stored predetermined primary display grades with two or more of the stored secondary display grades is stored in a storage area, and wherein the storage area storing said information is located in the memory storing the predetermined primary display grades and the secondary display grades.

10. The television receiver of claim 1, wherein:
    the secondary display grades for each primary display grade correspond to a respective number of predetermined and stored contrast values.

11. The television receiver of claim 10, wherein:
    the second display grades for each primary display grade include a first number of secondary display grades and a second number of secondary display grades, and
    the first number of secondary display grades corresponds to a first number of contrast values respectively spaced by a first value,
    the second number of secondary display grades corresponds to a second number of contrast values respectively spaced by a second value, and
    the first value is different from the second value.

12. The television receiver of claim 10, wherein:
    the secondary display grades for each primary display grade correspond to a same stored color value, and
    the stored color values corresponding to the primary display grades are different.

13. The television receiver of claim 10, wherein:
    the secondary display grades for each primary display grade correspond to a same stored sharpness value, and
    the stored sharpness values corresponding to the primary display grades are different.

14. The television receiver of claim 10, wherein at least one stored parameter corresponding to a first primary display grade is maintained irrespective of changes in secondary display grades corresponding to the first primary display grade.

15. The television receiver of claim 14, wherein the at least one parameter is color, tint, or sharpness.

16. A method of controlling at least one display characteristic in a television receiver having an illuminance sensor for detecting ambient illuminance, the method comprising:
    displaying a video signal via a display module;
    detecting an ambient illuminance;
    automatically determining, based on the detected ambient illuminance, one of a plurality of predetermined primary display grades for controlling at least one display characteristic of the display module;
    providing information to allow for user selection a plurality of predetermined secondary display grades corresponding to the determined primary display grade; and adjusting the at least one display characteristic according to the selected secondary display grade, wherein:

each predetermined primary display grade includes a first number of values, each predetermined secondary display grade includes a second number of values, the first number of values is greater than the second number of values, the predetermined primary display grades are different from the predetermined secondary display grades that are selectable by a user, the predetermined primary display grades and predetermined secondary display grades are stored in a memory before the ambient illuminance is detected, said one of the plurality of predetermined primary display grades is automatically selected by the controller without user input, and the information provided by the controller to allow for user selection of said one of the plurality of predetermined secondary display grades is automatically displayed after the ambient illuminance is detected by the sensor.

17. The method of claim 16, wherein the at least one display characteristic is selected from the group consisting of contrast, brightness, color, and sharpness.

18. The method of claim 16, wherein said providing includes generating on-screen display data for displaying the plurality of predetermined and pre-stored secondary display grades via the display module.

19. The method of claim 16, wherein adjusting the at least one display characteristic comprises:

determining a final display grade based on the predetermined primary display grade and the selected one of the predetermined and pre-stored secondary display grades;

generating at least one display characteristic control value corresponding to the final display grade; and controlling the display module based on the generated at least one display characteristic control value.

20. The method of claim 16, wherein information associating one of the stored predetermined primary display grades with two or more of the stored secondary display grades is stored in a storage area, and wherein the storage area storing said information is located in the memory storing the predetermined primary display grades and the secondary display grades.

21. A method of controlling at least one display characteristic in a television receiver having an illuminance sensor for detecting ambient illuminance, the method comprising:

pre-storing a plurality of predetermined primary display grades to control the at least one display characteristic of the display module;

pre-storing a plurality of predetermined secondary display grades to each of the plurality of predetermined and pre-stored primary display grades, the predetermined and pre-stored stored secondary display grades controlling the at least one display characteristic of the display module with respect to each primary display grade;

detecting an analog value corresponding to the detected ambient illuminance;

converting the detected analog value into a digital value;

automatically determining one of the primary display grades according to the digital value;

providing information to allow for user selection of one of the plurality of secondary display grades corresponding to the determined primary display grade; and adjusting the at least one display characteristic based on the determined primary display grade and the selected secondary display grade, wherein:

each primary display grade includes a first number of values, each secondary display grade includes a second number of values, the first number of values is greater than the second number of values, the primary display grades are different from secondary display grades that are selectable by a user, said one of the plurality of the primary display grades is automatically selected by the controller without user input, and the information to allow for selection of said one of the plurality of secondary display grades is automatically displayed after the ambient illuminance is detected.

22. The method of claim 21, wherein said providing includes:

displaying a plurality of value icons to allow for selection of one of the predetermined and pre-stored selected secondary display grades corresponding to the automatically determined one of the primary display grades.

23. The method of claim 21, wherein said providing includes:

displaying, in response to activation of a hot key, a plurality of value icons to allow for selection of one of the predetermined and pre-stored secondary display grades corresponding to the automatically determined primary display grade.

24. The method of claim 21, further comprising:

sampling the analog ambient illuminance value to generate the digital value; and changing a current primary display grade to one of a next-higher primary display grade and a next-lower primary display grade, if a boundary value between the current primary display grade and an adjacent primary display grade is passed by a predetermined value of the generated digital value.

25. The method of claim 21, wherein information associating one of the stored predetermined primary display grades with two or more of the stored secondary display grades is stored in a storage area, and wherein a storage area storing said information is located in a memory storing the predetermined primary display grades and the secondary display grades.

* * * * *